(12) United States Patent
Krishnamurthy et al.

(10) Patent No.: US 12,117,059 B2
(45) Date of Patent: Oct. 15, 2024

(54) BRAKE PAD DIMENSION ESTIMATION SYSTEM

(71) Applicant: NISSAN NORTH AMERICA, INC., Franklin, TN (US)

(72) Inventors: Vikram Krishnamurthy, Marietta, GA (US); Oliver Krishnamurthy, Marietta, GA (US)

(73) Assignee: Nissan North America, Inc., Franklin, TN (US)

( * ) Notice: Subject to any disclaimer, the term of this patent is extended or adjusted under 35 U.S.C. 154(b) by 165 days.

(21) Appl. No.: 17/824,850

(22) Filed: May 25, 2022

(65) Prior Publication Data

US 2023/0383806 A1 Nov. 30, 2023

(51) Int. Cl.
*F16D 66/02* (2006.01)

(52) U.S. Cl.
CPC ......... *F16D 66/028* (2013.01); *F16D 66/027* (2013.01)

(58) Field of Classification Search
CPC .............................. F16D 66/028; F16D 66/027
USPC .......................................................... 340/679
See application file for complete search history.

(56) References Cited

U.S. PATENT DOCUMENTS

| 9,945,437 | B2 | 4/2018 | Eden | |
|---|---|---|---|---|
| 2008/0236269 | A1* | 10/2008 | Howell | B60T 17/221 73/121 |
| 2018/0223935 | A1* | 8/2018 | Eden | F16D 66/024 |
| 2018/0231364 | A1* | 8/2018 | Mian | G01B 11/06 |
| 2020/0108659 | A1* | 4/2020 | Downey | B25J 9/1656 |
| 2021/0114408 | A1* | 4/2021 | Darolfi | B60B 29/00 |
| 2023/0142401 | A1* | 5/2023 | Brook | G06N 3/08 706/12 |

FOREIGN PATENT DOCUMENTS

| CN | 101349313 B | 2/2011 |
|---|---|---|
| EP | 2708771 B1 | 4/2017 |

* cited by examiner

*Primary Examiner* — Kerri L McNally

(74) *Attorney, Agent, or Firm* — Global IP Counselors, LLP

(57) ABSTRACT

A brake pad dimension estimation system includes a detecting device and an electronic controller. The detecting device is configured to obtain dimensional information from an image of a brake pad assembly. The electronic controller is in electronic communication with the detecting device to receive the dimensional information from the image of the brake pad assembly. The electronic controller is programmed to determine a dimension of the brake pad based on the image.

12 Claims, 7 Drawing Sheets

| Brake pad type (based on brand, manufacturer, location) | Brake pad thickness (R1A) | Baking plate thickness (R1A) | Reference images of brake pads (R1B) | Reference images of baking plates (R1B) | Reference images of brake pad and backing plate assembly (R1B) |
|---|---|---|---|---|---|
| | X millimeters<br>Y millimeters<br>Z millimeters | A millimeters<br>B millimeters<br>C millimeters |  |  |  |

R1

BRAKE PAD DIMENSION ESTIMATION SYSTEM

BACKGROUND

Technical Field

The present disclosure generally relates to a brake pad dimension estimation system. More specifically, the present disclosure relates to a brake pad dimension estimation system using optical information of a brake pad.

Background Information

Traditionally, measuring a brake pad thickness requires a series of complicated steps, including removing the tire, identifying the caliper and removing the bolts on the caliper. The caliper door can then be opened in order to access the brake pads. The brake pads are then removed for measuring. The complicated technique increases the cost of service for brake pad replacement at the dealership, particularly if the brake pads and are removed and measurement finds that no replacement is necessary. In these circumstances, the dealership absorbs the lost labor cost of disassembling the brake caliper assembly.

SUMMARY

In view of the state of the known technology, one aspect of the present disclosure is to provide a brake pad dimension estimation system includes a detecting device and an electronic controller. The detecting device is configured to obtain dimensional information from an image of a brake pad assembly. The electronic controller is in electronic communication with the detecting device to receive the dimensional information from the image of the brake pad assembly. The electronic controller is programmed to determine a dimension of the brake pad based on the image.

In view of the state of the known technology, another aspect of the present disclosure is to provide a method for estimating a brake pad dimension. The method comprising arranging a detecting device with respect to a vehicle brake caliper so that the detecting device captures an image of a brake pad assembly along a direction that is substantially tangent to a curve of the brake pad assembly. The method further comprises capturing the image of the brake pad assembly along the direction that is substantially tangent to the curve of the brake pad assembly. The method further comprises using a mobile device to determine a thickness of the brake pad assembly based on the captured image of the brake pad assembly.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
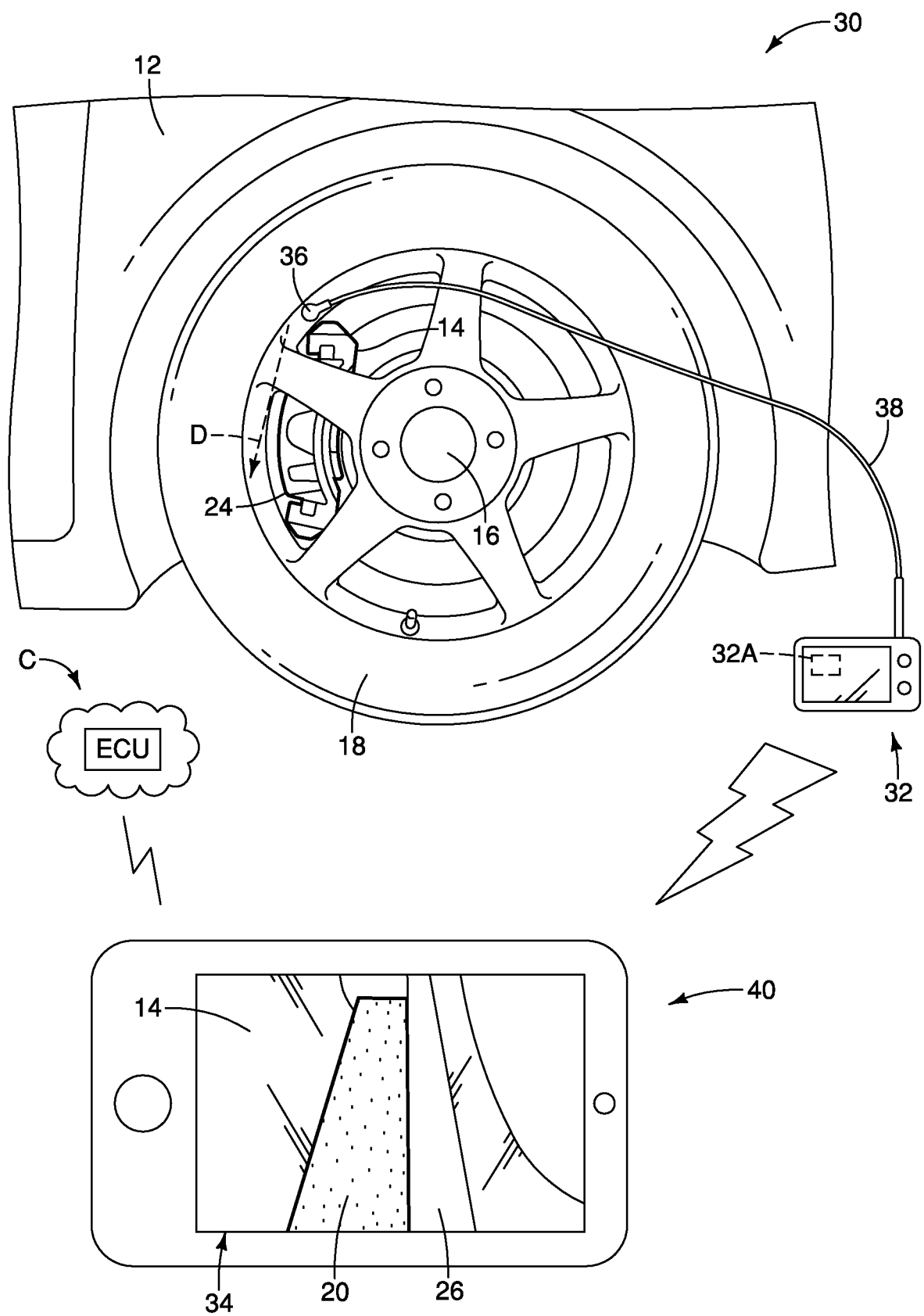
FIG. 1 is a side elevational view of a portion of a vehicle having a brake caliper assembly provided with a brake pad dimension estimation system in accordance with one illustrated embodiment.
Figure 3:
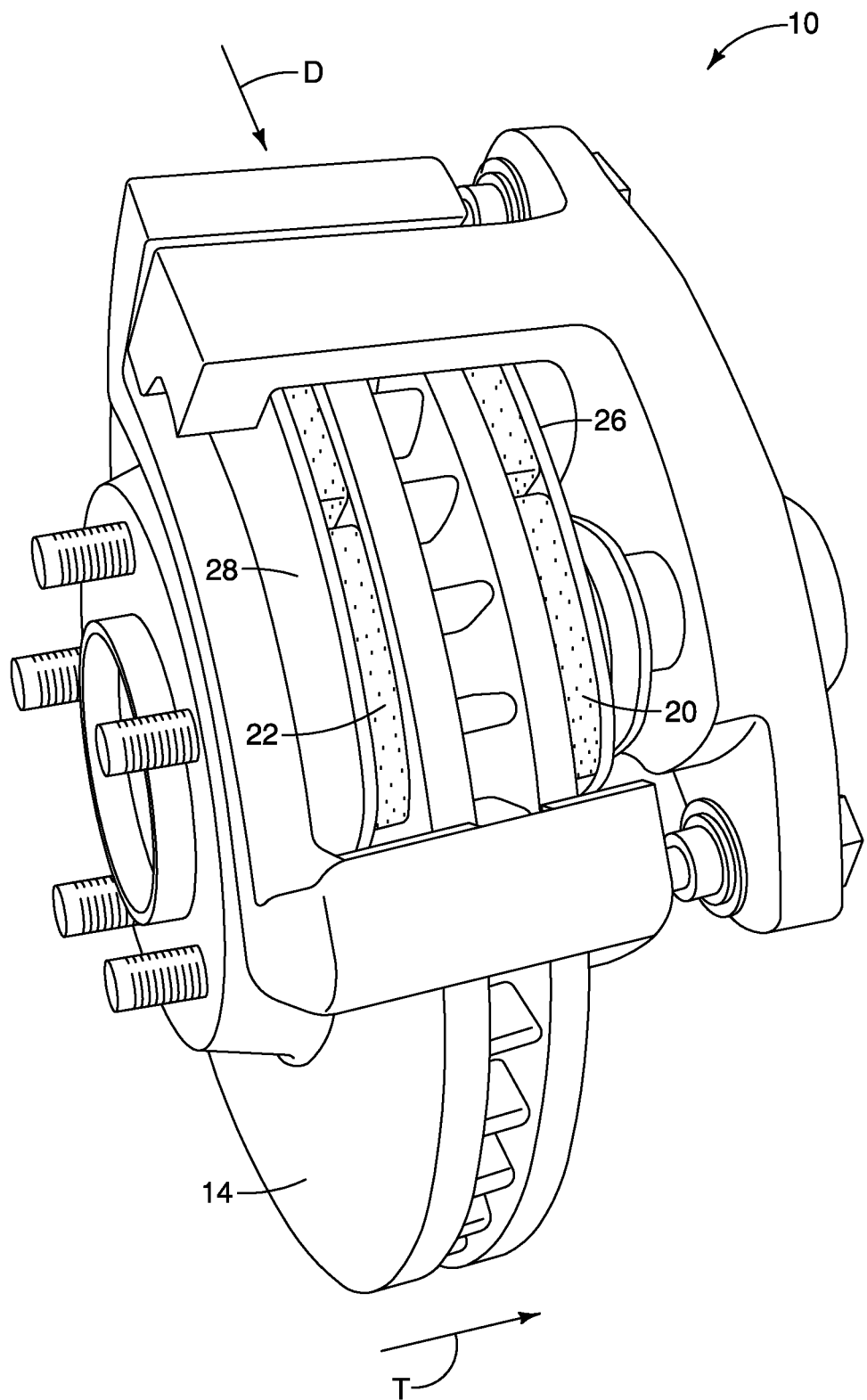
FIG. 3 is a perspective view of the brake caliper assembly.
Figure 4:
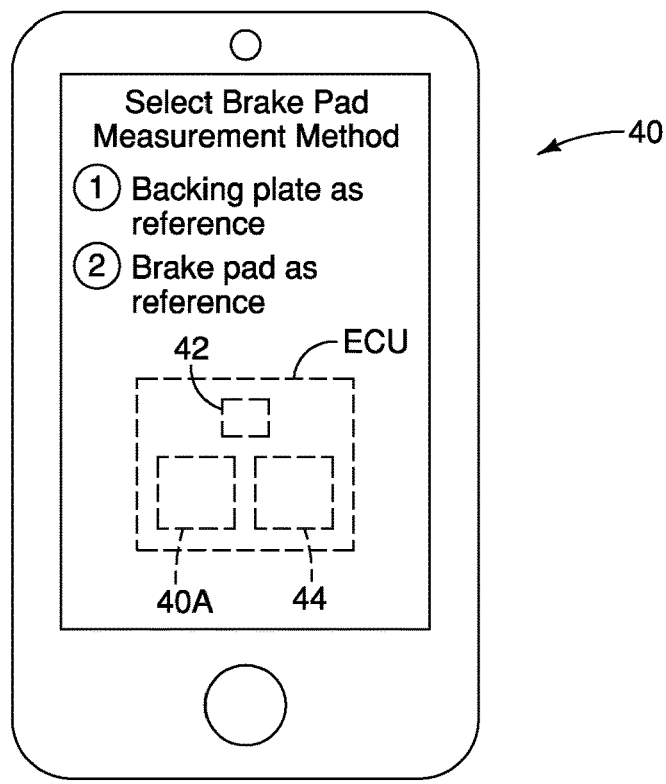
FIG. 4 is an elevational view of a mobile device of the brake pad dimension estimation system displaying a selection of methods for measuring the brake pad thickness.
Figure 5:
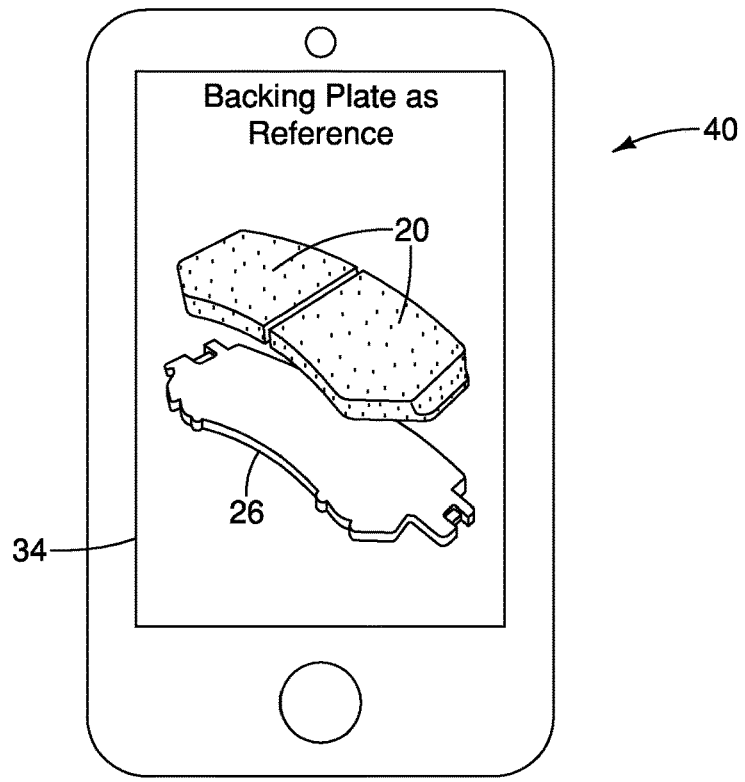
FIG. 5 is an elevational view of the mobile device displaying a brake pad installed to a backing plate to compare the thickness of the brake pad to the thickness of the backing plate.

Referring initially to FIG. 1, a vehicle brake caliper assembly 10 for a vehicle 12 is illustrated in accordance with an embodiment. The brake caliper assembly 10 includes a brake rotor 14 14 arranged along an axle 16. The vehicle brake caliper 24 further includes a vehicle tire 18 that is mounted to the axle 16 that receives rotational force from the axle 16. As best seen in FIG. 3, the brake caliper further includes a pair of first (outside) and second (inside) brake pads 20 and 22, and a brake caliper 24. The brake caliper 24 operates the brake pads 20 and 22 to grip the brake rotor 14. The brake pads 20 and 22 contact the brake rotor 14 to provide friction to the rotor 14 which enables the tire 18 to slow down and stop the vehicle 10.

The brake pads 20 and 22 are made of frictional material such as metallic fibers or metallic alloy fibers that are bonded to a backing plate 26 (i.e., a metal plate). The brake pads 20 and 22 are fixed to respective backing plates 26 and 28 in a conventional manner such as using rivets, adhesive, mold-in techniques or a mechanical retention system as appropriate. The backing plate 26 is typically made from steel and transfers force from the brake caliper piston evenly across the backing plate 26 to apply the friction material to the brake rotor 14.

In the illustrated embodiment, as the first and second brake pads 20 and 22 are identical, only the first brake pad 20 (outside brake pad 20) will be further described for simplicity. The brake pad 20 and the backing plate 26 together comprise a brake pad assembly of the vehicle brake caliper assembly 10. Therefore, the vehicle brake caliper assembly 10 includes the brake pad assembly having the brake pad 20 and the backing plate 26. As the brake pad 20 is made from a frictional material that regularly engages the rotor 14, the brake pad 20 is subject to being worn down over time. Eventually, the brake pad 20 is susceptible to becoming too thin to function properly when the frictional material is worn away and braking can become compromised.

Traditionally, measuring a brake pad thickness requires a series of complicated steps, including removing the tire 18, identifying the caliper 24 and removing the bolts on the caliper 24. The caliper door can then be opened in order to access the brake pads 20 and 22. The brake pads 20 and 22 are then removed for measuring. The complicated technique increases the cost of service for brake pad replacement at the dealership, particularly if the brake pads 20 and 22 are removed and measurement finds that no replacement is necessary. In these circumstances, the dealership absorbs the lost labor cost of disassembling the brake caliper assembly 10.

Therefore, a brake pad dimension estimation system 30 is provided in accordance with an illustrated embodiment. The brake pad dimension estimation system 30 is designed to be non-invasive such that it is not necessary to disassemble the tire 18, the caliper 24 or the brake pad 20 from the brake caliper assembly 10. In particular, the brake pad dimension estimation system 30 of the illustrated embodiment utilizes an optical approach to estimate a thickness of the brake pads 20 and 22 using captured images of the brake pads 20 and 22. By eliminating the need to disassemble the brake caliper assembly 10, the brake pad dimension estimation system 30 provides an accurate technique for estimating a thickness of the brake pad 20 such that the technique can be routinely implemented at regular vehicle servicing appointments at low cost. Therefore, disassembling of the brake caliper is necessary only when the brake pad dimension estimation system 30 finds that the brake pad thickness is too low. For example, if the brake pad dimension estimation system 30 finds that the brake pad 20 is three to four (3 to 4) millimeters in thickness, then the dealer can determine that the brake pads 20 and 22 are at the end of their lifespan and replacement is necessary.

In the illustrated embodiment, the term "thickness" of the brake pad 20 refers to a dimension of the brake pad 20 measured along a direction T that is parallel to the axle 16 when the brake caliper having the brake pads 20 and 22 is installed to the vehicle 12, as best seen in FIG. 3. In the illustrated embodiment, while the brake pad dimension estimation system 30 can be utilized to measure both the first and second brake pads 20 and 22, only measurement of the first brake pad 20 (outside brake pad 20) will be further described for simplicity. In application, the measurement result of the first brake pad 20 can be used to infer the thickness of the second brake pad 22 such that direct measurement of the second brake pad 22 is not necessary.

Figure 2:
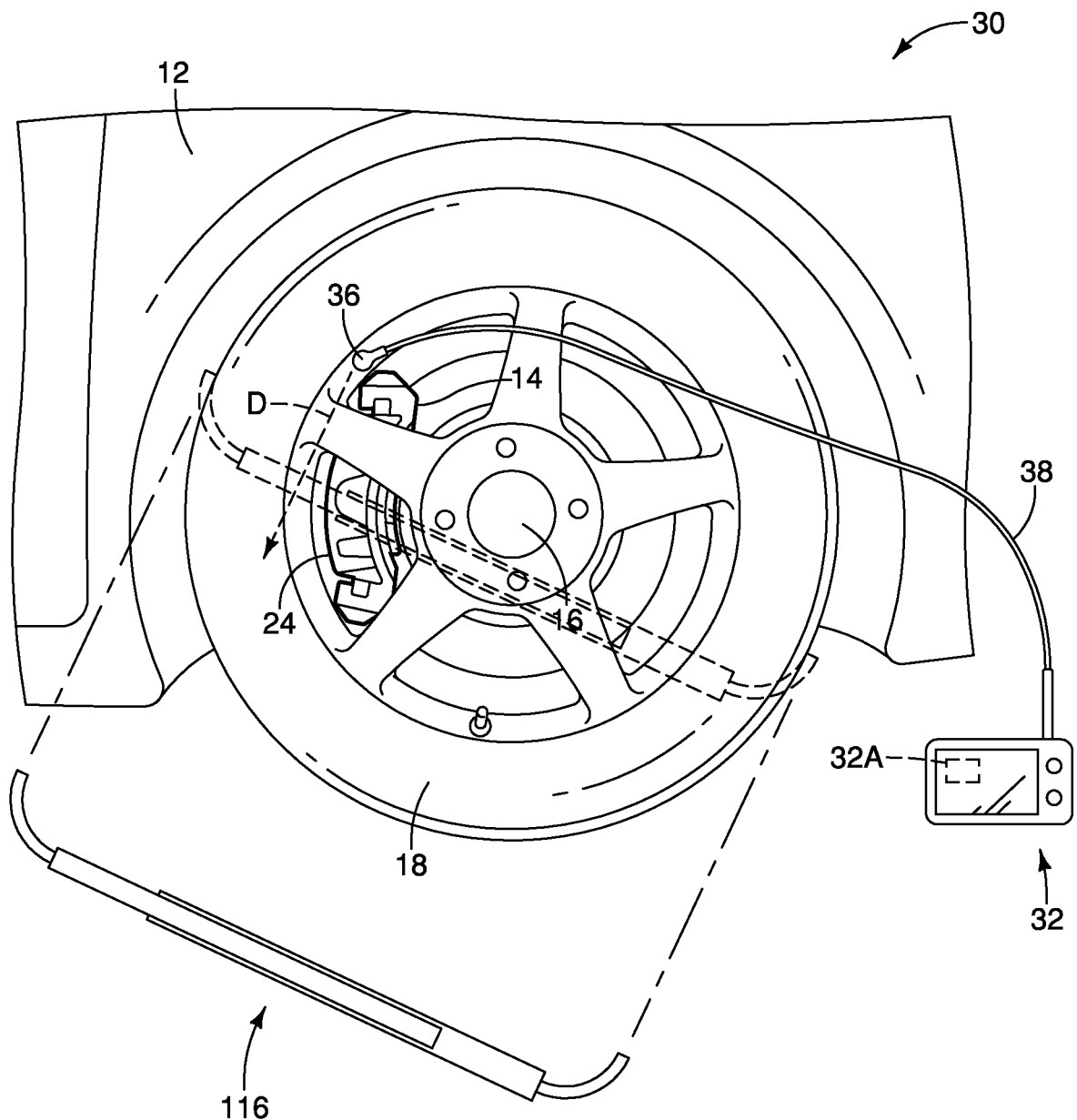
FIG. 2 is a side elevational view similar to FIG. 1 with a tire having an alignment bracket thereon to guide a detecting device of the brake pad dimension estimation system.

As best seen in FIGS. 1 and 2, the brake pad dimension estimation system 30 comprises a detecting device 32 and an electronic controller ECU. The brake pad dimension estimation system 30 further comprises a display 34 in electronic communication with the electronic controller ECU. The electronic controller ECU is programmed to control the display 34 to display a warning indication when the thickness of the brake pad 20 is determined to be below a threshold thickness value, as will be discussed below.

The detecting device 32 is configured to obtain dimensional information from an image of the brake pad assembly. The detecting device 32 includes a camera 36 configured to capture the image of the brake pad assembly (the brake pad 20 and the backing plate 26). The detecting device 32 can alternatively utilize radiation or ultrasound to capture the image of the brake pad assembly. The detecting device 32 can alternatively utilize light detection and ranging (LIDAR) to capture image information of the brake pad 20. The electronic controller ECU can create a 3D image of the brake pad 20 based on information detected using LIDAR to determine the thickness of the brake pad 20.

As shown, the detecting device 32 is preferably a wireless endoscope having an optical probe or the camera 36. The detecting device 32 is illustrated as an automotive endoscope that has a flexible optical cable 38 that can be manipulated along the brake caliper assembly 10. The detecting device 32 is in wireless communication with the electronic controller ECU that determines the thickness of the brake pad 20, as will be further discussed.

In the illustrated embodiment, the electronic controller ECU is part of a mobile device 40 that is in wireless communication with the detecting device 32. In the illustrated embodiment, the mobile (external) device is provided to be used with the detecting device 32. Examples of the mobile device 40 include a smartphone, a tablet or a personal computer. The detecting device 32 is equipped with a wireless communicator 32A and the electronic controller ECU is equipped with a corresponding wireless communicator 40A. The wireless communicator 32A of the detecting device 32 and the wireless communicator 40A of the mobile device 40 are preferably disposed on a respective printed circuit board PCB that is disposed in the mobile device 40 and the detecting device 32. The wireless communicators 32A and 40A can be equipped with Bluetooth technology, including Bluetooth low energy, Wi-Fi, or include the wireless protocol ANT+.

The term "wireless communicator" as used herein includes a receiver, a transmitter, a transceiver, a transmitter-receiver, and contemplates any device or devices, separate or combined, capable of transmitting and/or receiving wireless communication signals, including shift signals or control, command or other signals related to some function of the component being controlled. The wireless communication signals can be radio frequency (RF) signals, ultra-wide band communication signals, or Bluetooth communications or any other type of signal suitable for wireless communications as understood in the vehicle field. Here, the wireless communication communicator can be a two-way wireless communication unit having a receiver and a transmitter.

Preferably, the mobile device 40 includes at least one software application that is installed to detect, measure, store and/or send information regarding the dimension of the brake pad 20. Therefore, the electronic controller ECU is in electronic communication with the detecting device 32 to receive the dimensional information from the image of the brake pad assembly. That is, the detecting device 32 can upload image data to the mobile device 40 to be processed by the electronic controller ECU in the mobile device 40. The electronic controller ECU is programmed to determine a dimension (the thickness) of the brake pad 20 based on the image.

The electronic controller ECU is capable of processing the images captured by the detecting device 32. The electronic controller ECU includes a processor 42 for processing data captured by the detecting device 32. For example, the images captured by the detecting device 32 can be processed to generate images by video codec(s), and/or the processor 42, and/or graphics hardware, and/or a dedicated image processing unit incorporated within the camera 36 circuitry. The mobile device 40 preferably includes memory or storage 44 for storing programs and processes as will be discussed below. The images captured by the detecting device 32 be stored in the memory and/or the storage 44 of the mobile device 40. The memory can include one or more different types of media used by processor 42, graphics hardware, and image capture circuitry to perform device functions. For example, memory may include memory cache, ROM, and/or RAM.

The storage 44 of the mobile device 40 can be any a non-transitory computer readable medium such as a ROM device, a RAM device, a hard disk, a flash drive, cloud drive, etc. The storage 44 is configured to store settings, programs, data, calculations and/or results of the processor(s) 42. That is, the electronic controller ECU can include a program or an application that controls the detecting device 32 to capture the image of the brake pad 20.

In the illustrated embodiment, the electronic control unit ECU can as be provided with the mobile device 40. The electronic control unit ECU can alternatively be provided as part of an external server or a remote server, as seen in FIG. 1. For example, the processing and computing operations described for the electronic control unit ECU herein can alternatively be performed on a cloud C. That is, the programs and applications for estimating the brake pad thickness can be stored on the cloud C which the mobile device 40 can be connected to. The electronic control unit ECU can therefore be a central processing unit CPU of the cloud C so that the computation for the brake pad thickness is performed on the cloud. For simplicity, the electronic control unit ECU will be hereafter described as being part of the mobile device 40.

Figure 8:
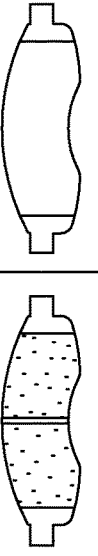
FIG. 8 is a chart showing different examples of reference brake pad thickness values.
Figure 8:
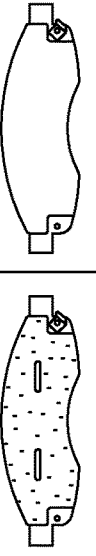
Figure 8:
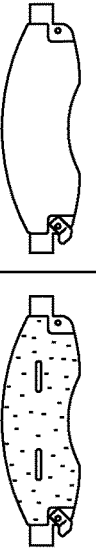

In the illustrated embodiment, the storage 44 is configured to store at least one reference image and/or thickness of the brake pad 20. More particularly, the storage 44 is configured to store a plurality of reference thickness values R1 (e.g., R1A and R1B). For example, the storage 44 can store images of brake pads of varying thickness values that can be used as reference for comparison to the detected values obtained by the detecting device 32. Therefore, the mobile device 40 includes pre-stored reference thickness values R1A that will be used to determine the thickness of the brake pad 20. For example, the storage 20 can store known thickness values of brake pads of different brands, makes and manufacturers (labeled as R1A in FIG. 8). More preferably, the storage 44 preferably stores an image library having a plurality of reference brake pad images R1B for comparing to the captured image of the brake pad 20. As seen in FIG. 8, a sample dataset of prestored reference thickness values R1 is illustrated. As shown, the sample dataset can include either reference images or known thicknesses of the brake pads. Therefore, the reference thickness values R1 can include either reference images or known thicknesses of the brake pads depending on type, brand or manufacture, etc.

The storage 44 can also store non-transitory computer readable media (e.g., audio, image and video files), computer program instructions or software, preference information, device profile information, and any other suitable data. The storage 44 preferably further contains convolutional neural networks (CNN) or other types of image recognition/processing software. The memory and/or the storage 44 can be used to retain computer program instructions or code organized into one or more modules and written in any desired computer programming language. The processor 42 of the electronic controller ECU can execute such computer program code by implementing one or more of the methods described herein.

As shown in FIGS. 4 to 7, the mobile device 40 further includes an electronic display 34 that can display information regarding the reference images that are prestored in the storage 44, and/or live images captured by the detecting device 32. The electronic display 34 can further display other information accessible by the processor 42 of the electronic controller ECU. The electronic display 34 is preferably a touchscreen that is an assembly of both an input ('touch panel') and output ('display') device. The touch panel is normally layered on the top of an electronic visual display of an information processing system. The electronic display 34 can be an liquid-crystal display (LCD), active-matrix organic light-emitting diode (AMOLED) display, or an organic light-emitting (OLED) display.

The user can give input or control the information processing system through multi-touch gestures by touching the screen with a special stylus or one or more fingers. The user can use the touchscreen to react to what is displayed and, if the software allows, to control how it is displayed; for example, zooming to increase the text size. As stated, the electronic controller ECU is programmed to control the electronic display 34 to display a warning indication. The warning indication can include text such as "the brake pad 20 needs replacement" or "the brake pad 20 will need replacement soon."

The processor 42 of the electronic controller ECU can be any suitable programmable control device capable of executing instructions necessary to carry out or control the operation of the many functions performed by the mobile device 40 (e.g., such as the processing of images captured by the detecting device 32 and/or infrared imaging or ultrasound). The processor 42 can, for instance, control the electronic display 34 and receive user input from user interface which can take a variety of forms, such as a button, keypad, dial, a click wheel, keyboard, display screen and/or a touch screen. The processor 42 can be a system-on-chip such as those found in mobile devices and include a dedicated graphics processing unit (GPU).

The processor 42 can be based on reduced instruction-set computer (RISC) or complex instruction-set computer (CISC) architectures or any other suitable architecture and may include one or more processing cores. The mobile device 40 is preferably further equipped with graphics hardware such as special purpose computational hardware for processing graphics and/or an assisting processor 42 to process graphics information. The graphics hardware can include one or more programmable graphics processing units (GPUs).

Referring to FIG. 2, the brake pad dimension estimation system 30 can further comprise an alignment bracket 46 that can be used for estimating the brake pad thickness. In particular, the alignment bracket 46 can be used to help guide the detecting device 32 to capture the image of the brake pad 20 for measurement. As shown, the alignment bracket 46 can be a telescoping rod having an adjustable length. As shown, the alignment bracket 46 is removably attachable to the wheel across a diameter length of the wheel. When the alignment bracket 46 is mounted to the vehicle wheel, the alignment bracket 46 forms a reference line to guide the user of the detecting device 32 to operate the detecting device 32 to capture the image of the thickness of the brake pad 20. In particular, the user preferably directs the optical cable 38 to extend at a direction that is orthogonal to the alignment bracket 46.

In particular, the user optimally guides the optical cable 38 at a ninety degree angle relative to the alignment bracket 46 towards the brake caliper assembly 10. In this way, the optical probe can capture an image of the brake pad 20 that is tangential to the curve of the brake pad 20, as schematically shown in FIGS. 1 to 3.

In the illustrated embodiment, a method for estimating a brake pad 20 dimension is disclosed. The method comprises arranging the alignment bracket 46 to the vehicle brake caliper assembly 10 along the diameter length of the vehicle brake caliper assembly 10. The method further comprises arranging the detecting device 32 with respect to the vehicle brake caliper assembly 10 along a direction that is orthogonal to the alignment bracket 46. The method for estimating the brake pad 20 dimension also comprises arranging the detecting device 32 with respect to the vehicle brake caliper assembly 10 so that the detecting device 32 captures an image of the brake pad assembly along a direction D that is substantially tangent to the outer curve of the brake pad assembly, as best seen in FIGS. 1 and 2.

Figure 7:
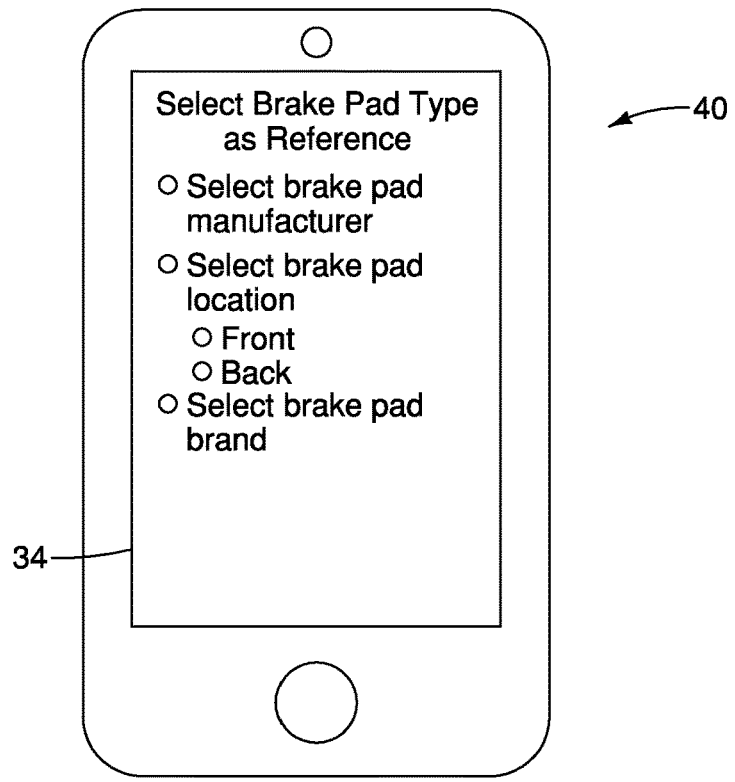
FIG. 7 is an elevational view of the mobile device displaying different selection options for the user to identify the relevant reference brake pad thickness value.

Thus, the method further comprises capturing the image of the brake pad assembly along the direction D that is substantially tangent to the curve of the brake pad assembly. The method further comprises using the mobile device 40 to determine the thickness of the brake pad assembly based on the captured image of the brake pad assembly. As seen in FIG. 7, the method of further comprises operating the mobile device 40 to select the brake pad type, such as the brake pad brand name, the manufacturer of the brake pad or the location of the brake pad. The electronic control unit ECU can then determine the degree of wear of the brake pad 20 by comparing it to reference thickness values R1 depending on the brand, manufacturer or location of the brake pad.

As will be further described, the means for determining the thickness includes software or programs that are installed onto the mobile device 40 or alternatively in the cloud C with which mobile device 40 communicates. In the illustrated embodiment, the means for determining the thickness of the brake pad 20 includes using either the backing plate 26 as a reference thickness value for determining an erosion of brake pad 20, or using pre-stored brake pad thickness values as reference thickness values for determining the erosion of the brake pad 20. Thus, the means includes one of using a measured thickness of the backing plate 26 of the brake pad assembly and using a prestored brake pad reference thickness value R1, as will be further described below.

Referring, to FIGS. 5 to 8, the electronic controller ECU is programmed to calculate a dimension of the brake pad 20 with respect to a dimension of the backing plate 26. As stated, the backing plate 26 is a metal plate preferably made out of steel while the brake pad 20 is made from a frictional material that can be worn down over time. Therefore, the backing plate 26 has a constant thickness while the brake pad 20 has a variable thickness. The electronic controller ECU can be programmed to estimate the thickness of the brake pad 20 based on a ratio of the thickness of the brake pad 20 with respect to the thickness of the backing plate 26. Therefore, the electronic controller ECU is programmed to calculate a ratio of the thickness of the backing plate 26 with respect to the thickness of the backing plate 26.

When the ratio falls below a predetermined ratio that is a threshold value R2, then the electronic controller ECU can control the electronic display 34 to display the warning indication to the user. Therefore, the electronic controller ECU is programmed to control the display 34 to display the warning indication when the calculated ratio is below the predetermined ratio. The storage 44 of the electronic controller ECU therefore preferably stores the predetermined ratio. Therefore, the storage 44 stores the predetermined ratio of the thickness of the backing plate 26 with respect to the thickness of the backing plate 26. The electronic controller ECU is programmed to compare the calculated ratio to the predetermined ratio in order to determine whether the calculated ratio falls below the predetermined ratio that is stored in the storage 44.

In the illustrated embodiment, the storage 44 can alternatively contain one or more reference images of the brake pad 20 and/or the backing plate 26, as seen in FIG. 8. The electronic controller ECU can be programmed to compare the captured image of the brake pad 20 to either one of the reference images of the brake pad 20 and/or the backing plate 26 to determine a ratio of the thickness of the brake pad 20 with respect to the thickness of the reference images. The reference images can include reference images of different types of brake pads 20 and 22. Alternatively, the reference images can include reference images of a brake pad 20 assembled to a backing plate 26 and/or a brake caliper.

Figure 6:
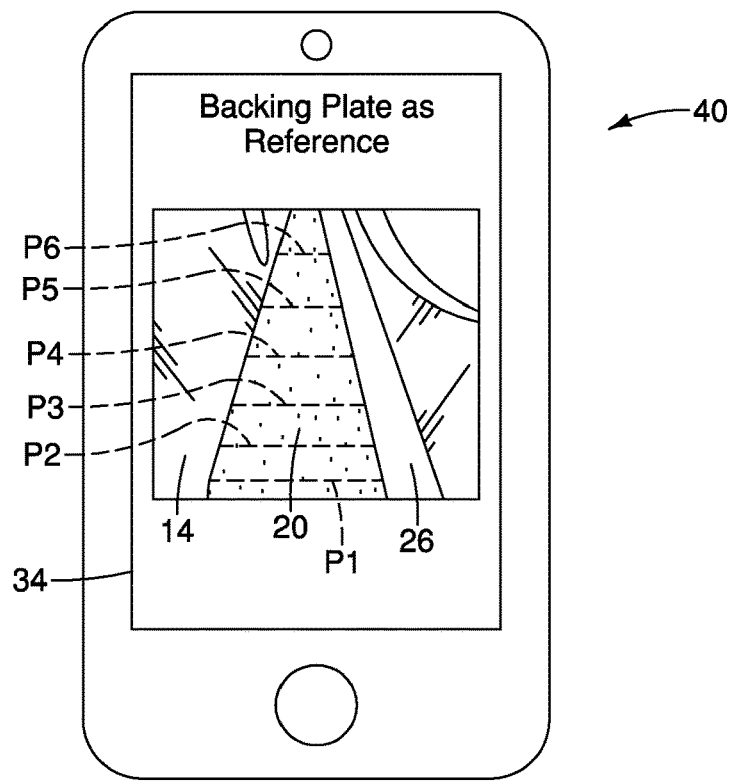
FIG. 6 is an elevational view of the mobile device displaying a thickness of the brake pad with respect the backing plate.

Preferably, the electronic controller ECU is programmed to determine an average thickness of the brake pad 20 based on the captured image of the brake pad 20. For example, the electronic control is programmed to measure a thickness of brake pad 20 along multiple points on the captured image of the brake pad 20, for example as seen in FIG. 6. For example, FIG. 6 schematically illustrates a series measurements that extend across the curved edge of the brake pad 20 which can be utilized by the electronic controller ECU to determine an average thickness based on the series of measurements. The electronic controller ECU is programmed to determine an average thickness based on the measured thicknesses. The average thickness is used for the ratio comparison with respect to the backing plate 26. Preferably, the electronic controller ECU is programmed to determine the thickness of the brake pad 20 at several locations along the length of the brake pad 20.

Referring now to FIGS. 6 to 9, the electronic controller ECU is preferably further programmed to compare the dimensional information of the brake pad 20 captured by the detecting device 32 with a selected one of the reference brake pad thickness values R1. That is, the user can alternatively select a means the brake pad's 20 type, as seen in FIG. 7, for pulling up the reference brake pad thickness values. Therefore, the storage 44 of the electronic controller ECU can store a plurality of reference brake pad thickness values R1. For example, the storage 44 can be prestored with a variety of known brake pad 20 types or brands. The user can select the brake pad 20 type or brand that is installed onto the brake caliper assembly 10, such as by selecting one of a plurality of images as seen in FIG. 8. Therefore, in the illustrated embodiment, the reference thickness value(s) R1 can be based on prestored images of different types of brake pads.

The electronic controller ECU can measure the brake pad thickness based on multiple points (measurements) in the image and use the measured values to calculate the average thickness, as described above. As shown in Figure, the electronic controller ECU measures thickness of the brake pad 20 at points P1 to P6 to illustrate varying measurement points that can be taken along the brake pad 20 to determine the average thickness of the brake pad 20. The electronic controller ECU is programmed to calculate the ratio of the thickness of the brake pad 20 to the selected one of the reference brake pad thickness values R1 to determine whether the brake pad 20 falls below a predetermined threshold value R2. Alternatively, the electronic controller ECU is programmed to compare the calculated ratio to the selected one of the reference brake pad thickness values R1 directly. The electronic controller ECU is programmed to control the display 34 to display the warning indication when the calculated ratio is below the predetermined threshold value R2.

In the simplest embodiment, the electronic controller ECU can be programmed to measure a thickness of the brake pad 20 and compare the measured thickness to the pre-stored threshold thickness value R2, such as three to four (3 to 4) millimeters. That is, a typical brake pad 20 has a thickness of approximately ten to twelve (10 to 12) millimeters. When the electronic controller ECU determines that the measured thickness of the brake pad 20 is approximately five to six (5 to 6) millimeters, the electronic controller ECU can control the display 34 to display an alert indication to the user that the brake pad 20 may need replacement soon. When the electronic controller ECU determines that the measured thickness of the brake pad 20 is approximately 3 to 4 millimeters, the electronic controller ECU can control the display 34 to display a warning indication that the brake pad 20 needs replacement immediately.

Therefore, the electronic controller ECU can be programmed to store a plurality of threshold thickness values R2 (e.g., 5 to 6 millimeters, or 3 to 4 millimeters). When the measured thickness of the brake pad 20 falls below the threshold thickness values R2, the display 34 can display different types of indications to the user indicating that replacement is soon or immediately necessary. Thus, in the simplest embodiment, the threshold thickness value R2 can be the same as the reference thickness value R1 for direct comparison to the measured values of the brake pad 20.

Figure 9:
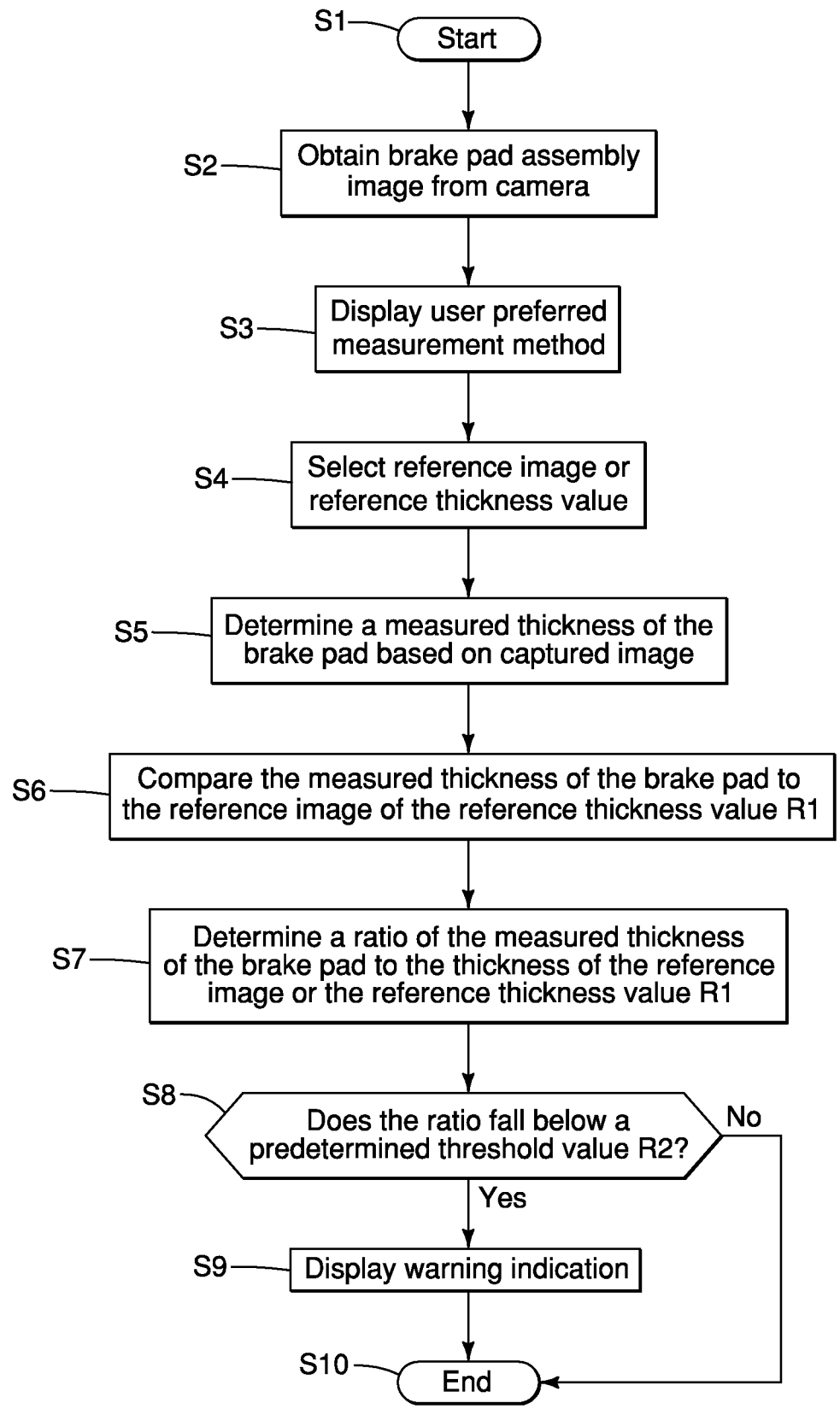
FIG. 9 is a flowchart showing a series of steps that can be executed by an electronic controller of the mobile device.

Referring now to FIG. 9, a process of the electronic controller ECU is illustrated in accordance with an illustrated embodiment. In step S1, the brake pad dimension estimation system 30 can be initiated by the user opening a program or an application in the mobile device 40. In step S2, the electronic controller ECU of the brake pad dimension estimation system 30 obtains the image of the brake pad assembly from the detecting device 32 (the camera 36). As stated, the mobile device 40 is in wireless communication with the detecting device 32. Therefore, the mobile device 40 wireless receives the image data from the detecting device 32.

In step S3, the electronic controller ECU can control the display 34 to display a preferred measurement method, such as either using a thickness of the backing plate 26 as a reference for comparison or using images of brake pads with varying thickness values as a reference for comparison. The display 34 can display a message similar to that shown in FIG. 4. In step S4, based on the user's selection, the electronic controller ECU can select the preferred method for estimating the brake pad thickness.

In step S5, the electronic controller ECU measures the thickness of the brake pad 20 based on the captured image from the detecting device 32. As stated, the electronic controller ECU preferably measures the thickness of the brake pad 20 at several points P1 to P6 along the brake pad 20 and calculates an average thickness, as seen in FIG. 6. In step S6, the electronic controller ECU compares the measured thickness (or the average of the measured thickness values) to any of the prestored reference thickness values R1A or the prestored images R1B that have been discussed. In step S7, the electronic controller ECU determines a ratio based on the comparison obtained in step S6.

In step S8, the electronic controller ECU determines whether the ratio determined in step S7 falls below the predetermined threshold value R2. For example, the electronic controller ECU can determine that the brake pad thickness is less than half of the thickness of the backing plate 26. Alternatively, the electronic controller ECU can determine that the brake pad thickness is less than half of the brake pad thickness values that are prestored in the storage 44. If the electronic controller ECU determines that the brake pad thickness does fall below the threshold value, then the electronic controller ECU can control the display 34 to display a warning indication or message to the user in step S9. If the electronic controller ECU determines that the brake pad thickness does not fall below the threshold value then the system ends in step S10.

With the brake pad dimension estimation system 30, the electronic control unit ECU is programmed to achieve the technical improvement of enhanced estimation of brake pad dimensions using image information captured by the detecting device. Further, the electronic control unit ECU is programmed to compare reference information and data (e.g., as shown in FIG. 8) to image data captured by a camera to achieve the technical improvement of enhanced prediction, estimation and calculation of a brake pad dimension.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle provided with the brake pad dimension estimation system. Accordingly, these terms, as utilized to describe the present invention should be interpreted relative to a vehicle provided with the brake pad dimension estimation system.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A brake pad dimension estimation system, comprising:
a detecting device including a camera configured to obtain dimensional information from an image of a brake pad assembly captured by the camera; and
an electronic controller in electronic communication with the detecting device to receive the dimensional information from the image of the brake pad assembly, the electronic controller being programmed to determine a dimension of the brake pad based on the image, the electronic controller including a storage that stores a plurality of reference brake pad thickness values, the electronic controller further being programmed to compare the dimensional information of the brake pad captured by the camera with a selected one of the reference brake pad thickness values.

2. The brake pad dimension estimation system according to claim 1, wherein
the brake pad assembly includes a brake pad and a backing plate, the brake pad being fixed to the backing plate.

3. The brake pad dimension estimation system according to claim 2, wherein
the electronic controller is programmed to calculate a dimension of the brake pad with respect to a dimension of the backing plate.

4. The brake pad dimension estimation system according to claim 3, wherein
the electronic controller is programmed to calculate a ratio of a thickness of the brake pad with respect to a thickness of the backing plate.

5. The brake pad dimension estimation system according to claim 4, wherein
the electronic controller includes a storage that stores a predetermined ratio of the thickness of the brake pad with respect to the thickness of the backing plate,
the electronic controller is programmed to compare the calculated ratio to the predetermined ratio.

6. The brake pad dimension estimation system according to claim 5, further comprising
a display in electronic communication with the electronic controller,
the electronic controller being programmed to control the display to display a warning indication when the calculated ratio is below the predetermined ratio.

7. The brake pad dimension estimation system according to claim 1, wherein
the electronic controller is programmed to calculate a ratio of a thickness of the brake pad to the selected one of the reference brake pad thickness values.

8. The brake pad dimension estimation system according to claim 7, wherein
the electronic controller is programmed to compare the calculated ratio to the selected one of the reference brake pad thicknesses.

9. The brake pad dimension estimation system according to claim 8, further comprising
a display in electronic communication with the electronic controller,
the electronic controller being programmed to control the display to display a warning indication when the calculated ratio is below the predetermined ratio.

10. The brake pad dimension estimation system according to claim 1, further comprising
a mobile device, the electronic controller being provided with the mobile device.

11. A method for estimating a brake pad dimension, comprising:
arranging a detecting device with respect to a vehicle brake caliper so that the detecting device captures an image of a brake pad assembly along a direction that is substantially tangent to a curve of the brake pad assembly;
capturing the image of the brake pad assembly along the direction that is substantially tangent to the curve of the brake pad assembly;
using a mobile device to determine a thickness of the brake pad assembly based on the captured image of the brake pad assembly;
arranging an alignment bracket to the vehicle brake caliper along a diameter length of the vehicle brake caliper by arranging the detecting device along a direction that is orthogonal to the alignment bracket; and
operating the mobile device to select a type of brake pad.

12. The method for estimating a brake pad dimension according to claim 11, wherein
selecting the type of brake pad includes selecting at least one of a brake pad brand, manufacturer or location.

* * * * *